US012794946B2

(12) United States Patent
Gangwani et al.

(10) Patent No.: US 12,794,946 B2
(45) Date of Patent: Nov. 10, 2026

(54) AUTOMATED IDENTIFICATION OF BENCHMARK SECURITY CONTROLS

(71) Applicant: Microsoft Technology Licensing, LLC, Redmond, WA (US)

(72) Inventors: Tvisha Rajesh Gangwani, Philadelphia, PA (US); Bugra Karabey, Redmond, WA (US); Cheng Cheng, Kirkland, WA (US); Sasikumar Natarajan, Redmond, WA (US); Andre Oneal Alfred, Redmond, WA (US); Jenna Sara Mansueto, Chicago, IL (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 61 days.

(21) Appl. No.: 18/591,572

(22) Filed: Feb. 29, 2024

(65) Prior Publication Data

US 2025/0280039 A1 Sep. 4, 2025

(51) Int. Cl.
*H04L 9/40* (2022.01)

(52) U.S. Cl.
CPC .................................... *H04L 63/20* (2013.01)

(58) Field of Classification Search
CPC ....................................................... H04L 63/20
See application file for complete search history.

(56) References Cited

U.S. PATENT DOCUMENTS

2022/0046059 A1* 2/2022 Pandurangi ............. H04L 63/20
2023/0229812 A1* 7/2023 Adebayo ................ G06N 20/00 726/26
2024/0080332 A1* 3/2024 Ganesh ................. G06F 21/577

OTHER PUBLICATIONS

Adam et al., "Cognitive Compliance: Analyze, Monitor and Enforce Compliance in the Cloud", IEEE, 12th International Conference on Cloud Computing, Jul. 8, 2019, pp. 234-242.
Adebayo et al., Automated Compliance Blueprint Optimization with Artificial Intelligence, arXiv:2206.11187v1, Jun. 22, 2022, 5 pages.
Agarwal et al., "AI-Assisted Security Controls Mapping for Clouds Built for Regulated Workloads", IEEE 14th International Conference on Cloud Computing, Sep. 5, 2021, pp. 136-146.
Extended European search report received in European Application No. 25159339.8, mailed on Jun. 2, 2025, 8 pages.
"Microsoft cloud security benchmark documentation", Retrieved from: https://learn.microsoft.com/en-us/security/benchmark/azure/, 2025, 5 Pages.

* cited by examiner

*Primary Examiner* — Noura Zoubair

(57) ABSTRACT

System, methods, apparatuses, and computer program products are disclosed for automatically identifying benchmark security controls. Service information related to a service of a customer is provided to a policy predictor model that is trained to predict a control mapping based on the service information. A predicted control mapping associated with a predicted security policy and a predicted security control are received from the policy predictor model. Implementation of the predicted security control enables the service of the customer to comply with a service requirement associated with the predicted security policy.

16 Claims, 7 Drawing Sheets

AUTOMATED IDENTIFICATION OF BENCHMARK SECURITY CONTROLS

BACKGROUND

Security control benchmarks are standards or sets of guidelines that organizations may use to assess the effectiveness of their security controls. Many security control benchmarks are based on widely accepted industry standards and frameworks. These benchmarks provide a framework for evaluating and improving an organization's security by establishing a baseline of security best practices. Security control benchmarks may cover various aspects of information security, including, but not limited to, policies, processes, technologies, and/or personnel. Identifying and implementing the proper security control benchmarks can help organizations enhance their overall security, demonstrate compliance with regulations, and/or mitigate the risks associated with cyber threats.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

System, methods, apparatuses, and computer program products are disclosed for automatically identifying benchmark security controls. Service information related to a service of a customer is provided to a policy predictor model that is trained to predict a control mapping based on the service information. A predicted control mapping associated with a predicted security policy and a predicted security control are received from the policy predictor model. Implementation of the predicted security control enables the service of the customer to comply with a service requirement associated with the predicted security policy.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
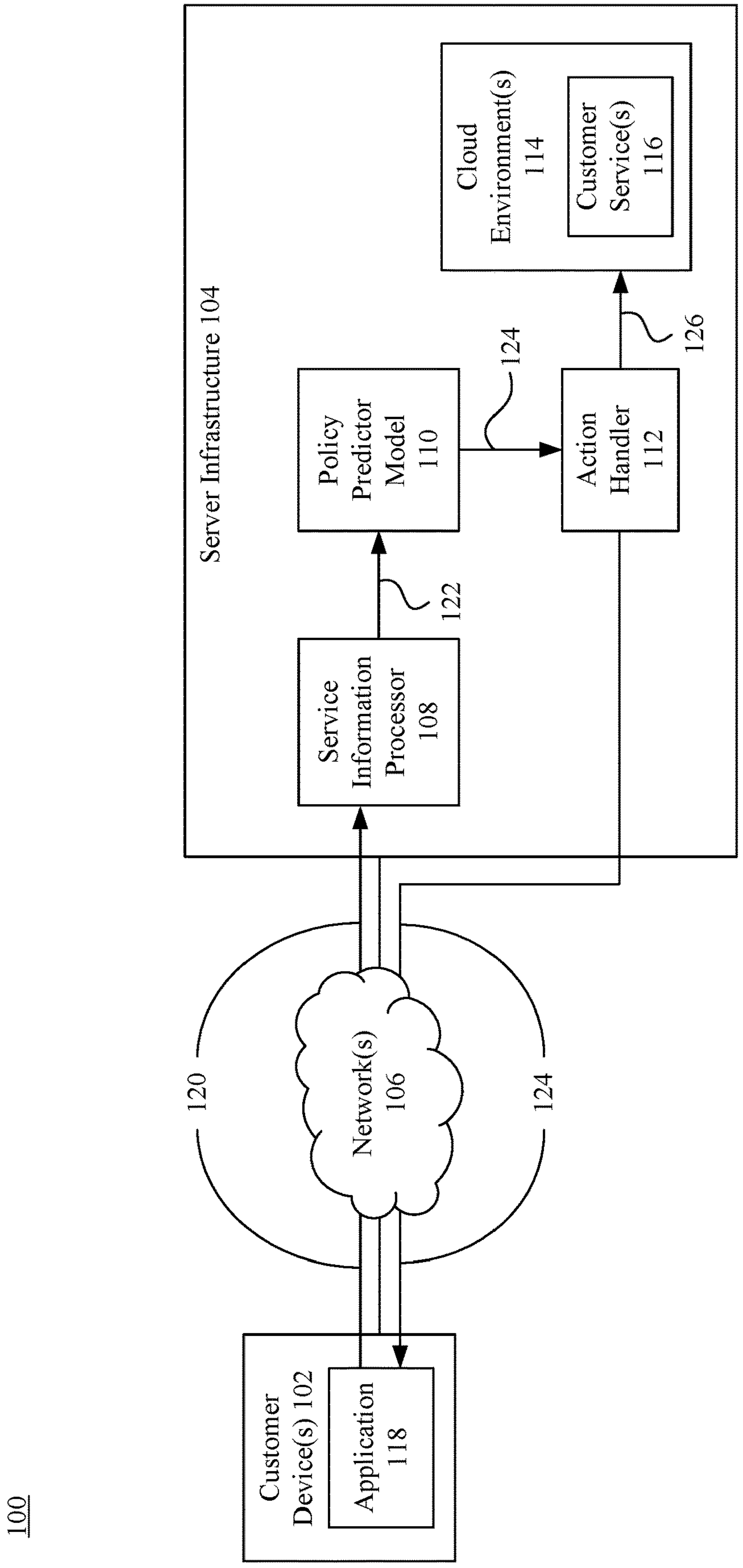
FIG. 1 shows a block diagram of an example system for automatically identifying a control mapping using a policy predictor model, in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Cloud service platforms release new cloud capabilities and features on a regular basis. As these new cloud capabilities and features are released, cloud customers develop and publish new customer services that incorporate the new cloud capabilities and/or features. In order to secure the customer services, associated resources need to be properly configured. Cloud security control benchmarks have been developed to provide guidelines and/or recommendations to help cloud customers evaluate the effectiveness of their security measures and/or ensure compliance with industry and government standards.

Various cloud security control benchmarks are available to cloud customers to help cloud customers enhance the overall security of their customer services, demonstrate compliance with regulations, and/or mitigate the risks associated with cyber threats. Such cloud security control benchmarks have been developed by various entities, such as, but not limited to, technology companies, cloud providers, standards setting organizations, government regulators, industry groups, industry regulators, and/or the like.

Identifying the relevant security controls to properly secure a customer service is an arduous process that requires specialized knowledge of the various cloud services and/or industry standards. This process is further complicated when customer services are deployed in multi-cloud and/or hybrid cloud environments. In such scenarios, securing the customer service may need to account for configurations of resources in many possible environments. Manual identification of control mappings rely on the knowledge of human beings, is time consuming, and is likely to result in imperfect and/or incorrect control mappings. While automatic identification of control mappings may be an improvement over manual identification, current solutions are unable to account for nuances in natural language descriptions associated with customer services, policy descriptions, policy rationales, and/or control mappings.

Embodiments disclosed herein are directed to automatic identification of control mappings using a machine-learning model. For example, a policy predictor model trained using machine-learning techniques can account for nuances in natural language descriptions and find the likeliest control mappings. Furthermore, the policy predictor model may be trained with control mappings applicable to various cloud environments to enable the policy predictor model to identify proper control mappings for services deployed in multi-cloud environments. Additionally, results provided by a policy predictor model may include a confidence score to enable automated implementation of control mappings in high-confidence scenarios.

In embodiments, subject matter experts may develop control mappings between security policies and corresponding security controls. Such control mappings facilitate compliance with security policies by facilitating the identification of security controls that, when implemented, result in compliance with the security policy. In order to improve identification of the security policies relevant to a particular customer service, embodiments disclosed herein employ a policy predictor model that is trained to predict a control mapping based on a similarity between a textual input and textual descriptions associated with the security policies.

In embodiments, the policy predictor model is trained based a labeled training dataset that includes a large number of training samples that comprise a textual description (e.g., policy description, control description, rationale, etc.) of a control mapping that maps a control identifier to a policy and/or rationale, and a label that identifies the control mapping. In embodiments, a first subset of the labeled training dataset may be used to train the policy predictor model, while a second subset may be reserved for validation of the trained policy predictor model. Various methods may be employed to train the policy predictor model, such as, but not limited to, the use of decision trees, a random forest algorithm, support vector machines, neural networks, k-Nearest Neighbors, K-means clustering, Naïve Bayes, gradient boosting, transfer learning, and/or the like.

In embodiments, the policy predictor model may be trained iteratively starting with a model initialized with initial weights. During an iteration, features are extracted from the textual descriptions of the security policies through various methods, such as, but not limited to, word embeddings, sentence embeddings, and/or the like. The extracted features may then be provided to the model to determine predicted control mapping identifiers. The predicted control mapping identifiers are compared, using a loss function, to the expected control mapping identifiers provided as labels in the labeled training dataset. The weights may be adjusted in iterations to reduce an error determined by the loss function. In embodiments, the policy predictor model may be trained until the error determined by the loss function satisfies an accuracy requirement and/or converges to a particular error value.

In embodiments, the policy predictor model may be trained using an ensemble method that combines the predictions of a plurality of machine-learning models. For example, the policy predictor model may be trained using a gradient boosting technique by building a series of weak learners and combining their predictions to create a robust and accurate model. This involves training a new learner to correct the errors made by the ensemble up to that point. Gradient boosting minimizes a predefined loss function by adjusting the weights of misclassified instances, where a new tree is fitted to the negative gradient of the loss function.

In embodiments, the trained policy predictor model may be validated based on a validation dataset. For instance, a subset of the labeled training dataset may be reserved for validation purposes. During validation, the trained policy predictor model is evaluated to determine how well the policy predictor model, which has been trained on a first subset of the labeled training dataset, can make accurate predictions on unseen data, such as a second subset of the labeled training dataset. In embodiments, the training and validation process may be performed through cross-validation, where iterations in a series of iterations includes training the model using a training dataset and validating the model using a separate validation dataset.

Once trained, the policy predictor model may be employed to predict, based on a textual description of a customer service, a relevant control mapping associated with a security policy and a corresponding security control. In embodiments, automatic identification of security controls begins by determining service information associated with the customer service. For instance, the service information may be determined by receiving, from a customer via an interface, a textual description of their service, such as, but not limited to, service requirements, a possible security threat, an attack vector associated with the security threat, a description of the security threat, and/or the like. In embodiments, the textual description of the service may be determined by analyzing an architectural diagram of the customer service using a threat analysis tool. In embodiments, the service information may be determined based on information from a plurality of sources. For example, the service information may be compiled from a plurality of cloud environments and/or on-premises resources to which the customer service is deployed.

In embodiments, the service information is provided as a textual input to the policy predictor model to determine a relevant control mapping. The policy predictor model may, in embodiments, extract features from the input text by, for example, but not limited to, generating a word embedding and/or sentence embedding representative of the semantic meaning of the input text. In embodiments, the policy predictor engine may output one or more predicted control mappings based on the extracted features. For instance, the policy predictor model may output the predicted control mapping with the highest confidence and/or similarity score, and/or output a ranked list of control mappings ranked based on their confidence and/or similarity scores. In embodiments, the policy predictor model may output one or more control mapping identifiers that identify a security policy and/or a corresponding security control. For instance, control mapping identifiers may, in embodiments, be determined based on a security policy identifier that identifies the security policy associated with the control mapping and a security control identifier that identifies the security control associated with the control mapping.

Various responsive actions may be performed based on a predicted control mapping that is associated with a predicted security policy and predicted security control. In embodiments, action handler may determine the responsive action to be performed based on one or more factors, such as, but not limited to, the predicted security policy, the predicted security control, customer preferences, the confidence and/or similarity score associated with the prediction, and/or the like. For instance, in embodiments, the predicted control mapping may be provided to the customer to enable the customer to implement the predicted security control on the customer service to comply with the predicted security policy. In embodiments, the predicted security control may be automatically implemented on behalf of the customer to comply with the predicted security policy. Automatic implementation of the predicted security control may, in embodiments, be performed by issuing one or more instructions and/or commands to one or more cloud and/or on-premises environments.

These and further embodiments are disclosed herein that enable the functionality described above and additional functionality. Such embodiments are described in further detail as follows.

For instance, FIG. 1 shows a block diagram of an example system 100 for automatically identifying a control mapping using a policy predictor model, in accordance with an embodiment. As shown in FIG. 1, system 100 includes one or more customer devices 102 communicatively coupled to a server infrastructure 104 via one or more networks 106. Furthermore, customer device(s) 102 includes an application 118, and server infrastructure 104 includes a service information processor 108, a policy predictor model 110, an action handler 112, and one or more cloud environments 114. Moreover, cloud environment(s) 114 may include one or more customer services 116 deployed thereon. System 100 is described in further detail as follows.

Customer device(s) 102 may comprise any type of stationary or mobile processing device, including, but not limited to, a desktop computer, a server, a mobile or handheld device (e.g., a tablet, a personal data assistant (PDA), a smart phone, a laptop, etc.), an Internet-of-Things (IoT) device, etc. As shown in FIG. 1, customer device(s) 102 includes an application 118 that can transmit to server infrastructure 104 one or more requests 120 for requesting one or more predicted control mappings 124. Various example implementations of customer device(s) 102 are described below in reference to FIG. 8 (e.g., computing device 802, network-based server infrastructure 870, on-premises servers 892, and/or components thereof).

In embodiments, application 118 may comprise various applications, such as, but not limited to, mobile applications, desktop applications, a web browser, server applications, scripts, and/or the like, configured to generate request(s) 120 for requesting for predicted control mapping(s) 124. In embodiments, application 118 may provide a user interface to enable a user to interact with policy predictor model 110 on server infrastructure 104 to request predicted control mapping(s) 124. In embodiments, application 118 may automatically interact with policy predictor model 110 via an application programming interface (API) to request predicted control mapping(s) 124. Various example implementations of application 118 are described below in reference to FIG. 8 (e.g., application programs 814, application programs 876, application programs 896, and/or components thereof).

Network(s) 106 may comprise one or more networks such as local area networks (LANs), wide area networks (WANs), enterprise networks, the Internet, etc., and may include one or more wired and/or wireless portions. Various example implementations of network(s) 106 are described below in reference to FIG. 8 (e.g., network 804, and/or components thereof).

Server infrastructure 104 may be a network-accessible server set (e.g., cloud-based environment or platform). In an embodiment, the underlying resources of server infrastructure 104 may be co-located (e.g., housed in one or more nearby buildings with associated components such as backup power supplies, redundant data communications, environmental controls, etc.) to form a datacenter, may be distributed across different regions, and/or may be arranged in other manners. In embodiments, the underlying resources of server infrastructure 104 may be owned and/or operated by a plurality of different entities (e.g., cloud providers). Various example implementations of server infrastructure 104 are described below in reference to FIG. 8 (e.g., network-based server infrastructure 870, and/or components thereof).

Customer service(s) 116 may include any computing resource and/or application of a cloud customer that is hosted in a hybrid-cloud and/or multi-cloud environment. For instance, customer service(s) 116 may be deployed on one or more of cloud environment(s) 114 and may utilize computing resources, storage resources, applications, and/or cloud services provided by cloud environment(s) 114. In embodiments, customer service(s) 116 may be duplicated across cloud environment(s) 114 in order to provide redundancy and improve service availability. In embodiments, customer service(s) 116 may combine computing resources, storage resources, applications, and/or cloud services provided by different cloud environment(s) 114 to provide customer service(s) 116. In embodiments, customer service (s) 116 may also utilize computing resources, storage resources, applications, and/or other services provided by an on-premises resource (not depicted).

Cloud environment(s) 114 may include cloud environments owned and/or operated by different entities (e.g., cloud providers) that provide cloud resources and/or services, such as, but not limited to, Infrastructure as a Service (IaaS), Platform as a Service (PaaS), Software as a Service (SaaS), Anything (or everything) as a service (XaaS), and/or the like. In embodiments, cloud environment(s) 114 may provide customer interfaces to provision, configure, deploy, monitor, and/or manage customer service(s) 116. For instance, cloud environment(s) 114 may, in embodiments, provide one or more APIs to enable customers to provision, configure, deploy, monitor, and/or manage customer service (s) 116.

Service information processor 108 is configured to accept, as input, request(s) 120 comprising service information associated with a service of a customer and process the input to produce processed service information 122 that is in a format that enhances the quality and/or effectiveness of policy predictor model 110. In embodiments, the input provided to service information processor 108 may include, but is not limited to, a description of the service, a service requirement associated with the service, resources associated with the service, entities associated with the service, a threat assessment associated with the service, a threat vector, an architectural diagram associated with an architecture of the service, and/or the like. In embodiments, the processing performed by service information processor 108 may include, but is not limited to, cleaning of raw text data by removing irrelevant characters, symbols, and/or formatting inconsistencies, tokenization to break down sentences into individual words and/or subword units, removal of stop words and/or commonly occurring terms that may not contribute significantly to the semantic meaning, stemming and/or lemmatization to normalize word forms, feature extraction to encode the input into numerical vectors that capture semantic meaning of the input, dimensionality reduction to reduce the number of features needed to represent the input, and/or the like. In embodiments, feature extraction may be accomplished through various techniques, such as, but not limited to, bag-of-words to represent the input based on word frequencies, TF-IDF (Term Frequency-Inverse Document Frequency), to weigh the importance of terms in the input to a larger corpus, word and/or sentence embeddings, such as, but not limited to, Word2Vec or GloVe, to capture semantic relationships between words. In embodiments, service information processor 108 may convert non-textual input into a textual format. For instance, when provided with an input comprising an architectural diagram of the service, service information processor 108 may analyze the architectural diagram to generate a textual description of the service, including, but not limited to, a service requirement associated with the service, resources associated with the service, entities associated with the service, a threat assessment associated with the service, a threat vector, and/or the like. In embodiments, service information processor 108 may provide processed service information 122 to policy predictor model 110 for classification.

Policy predictor model 110 is configured to receive processed service information 122 from service information processor 108 and determine predicted control mapping(s) 124 that are relevant to processed service information 122. In embodiments, predicted control mapping(s) 124 provided by policy predictor model 110 may include a confidence and/or similarity score that indicates a degree of relevancy or similarity between predicted control mapping(s) 124 and processed service information 122. In embodiments, policy predictor model 110 is trained using a supervised machine learning algorithm that will be described in greater detail below in conjunction with FIG. 2.

Action handler 112 is configured to receive predicted control mapping(s) 124 from policy predictor model 110 and perform a responsive action based on the predicted control mapping(s) 124. In embodiments, the responsive action performed may be determined based on one or more factors, such as, but not limited to, a predicted security policy associated with predicted control mapping(s) 124, a predicted security control associated with predicted control mapping(s) 124, customer preferences, the confidence and/or similarity score associated with predicted control mapping(s) 124, and/or the like. For instance, action handler 112 may, in embodiments, provide the predicted control mapping(s) 124 to the application 118 to enable the customer to implement a predicted security control associated with predicted control mapping(s) 124 on customer service(s) 116 to comply with a predicted security policy associated with predicted control mapping(s) 124. In embodiments, action handler 112 may automatically implement, on behalf of the customer, a predicted security control associated with predicted control mapping(s) 124 on customer service(s) 116 to comply with a predicted security policy associated with predicted control mapping(s) 124. For instance, action handler 112 may, in embodiments, automatically implement a predicted security control associated with predicted control mapping(s) 124 by issuing one or more instructions and/or commands 126 to one or more on-premises resources (not depicted) and/or cloud environment(s) 114. In embodiments, action handler 112 may issue instructions and/or commands 126 to cloud environment(s) 114 using one or more interfaces (e.g., APIs) provided by cloud environment(s) 114. In embodiments, action handler 112 may issue instructions and/or commands 126 to cloud environment(s) 114 to modify a configuration and/or operation of customer service (s) 116.

Figure 2:
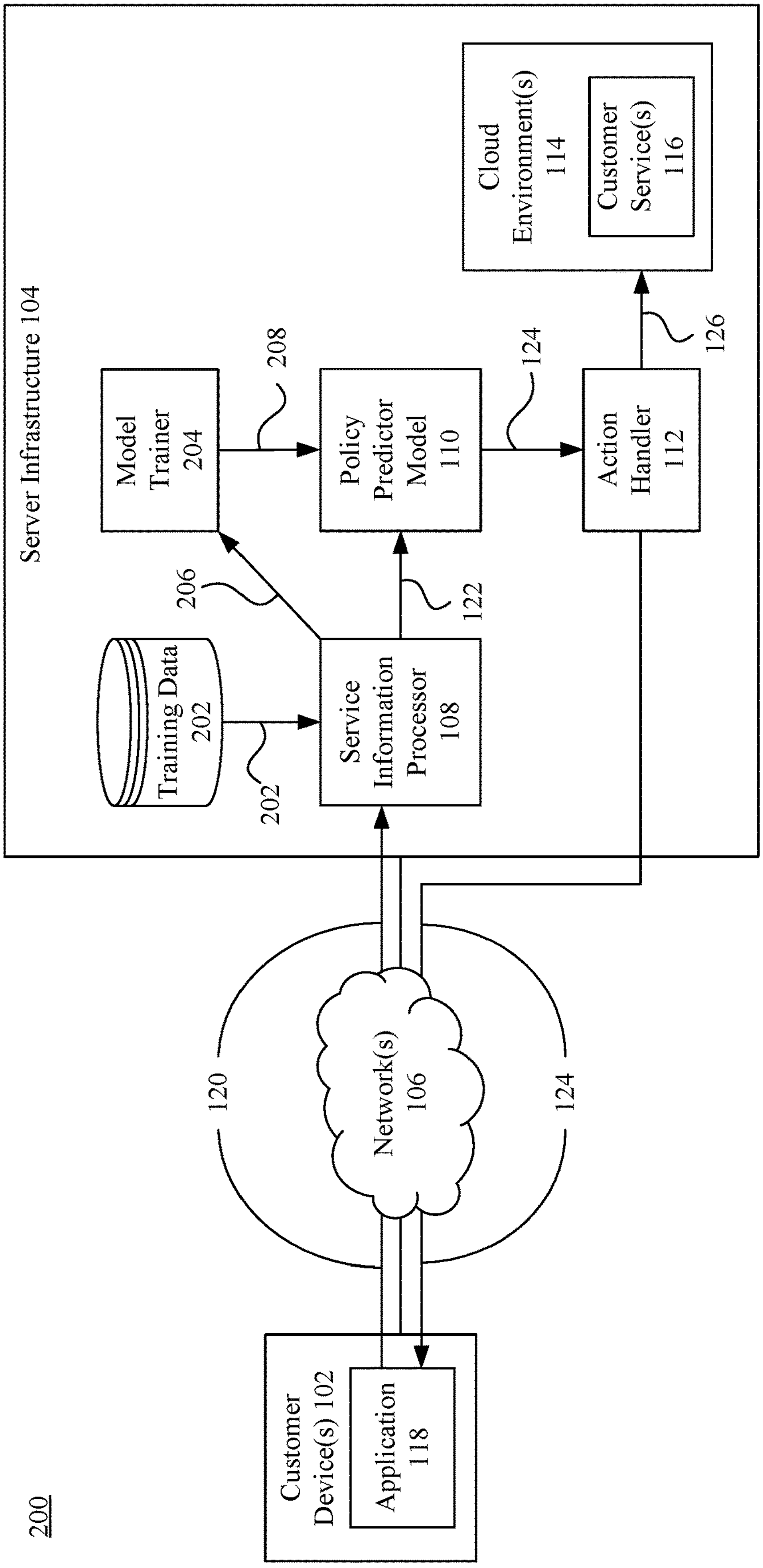
FIG. 2 depicts a block diagram of an example system for training a policy predictor model for identifying a control mapping and using the policy predictor model to identify a control mapping, in accordance with an embodiment.

Embodiments described herein may operate in various ways to train a policy predictor model for identifying a control mapping and using the policy predictor model to identify a control mapping. For instance, FIG. 2 depicts a block diagram of an example system 200 for training a policy predictor model for identifying a control mapping and using the policy predictor model to identify a control mapping, in accordance with an embodiment. As shown in FIG. 2, system 200 includes customer device(s) 102, server infrastructure 104, network(s) 106, service information processor 108, policy predictor model 110, action handler 112, cloud environment(s) 114, customer service(s) 116, and application 118. In system 200, server infrastructure 104 further includes training data 202, and a model trainer 204. System 200 is described in further detail as follows.

In embodiments, training data 202 may include a labeled training dataset with a plurality of training samples that comprise a textual description (e.g., policy description, control description, rationale, etc.) of a control mapping that maps a control identifier to a policy and/or rationale, and a label that identifies the control mapping. In embodiments, the label may include a control mapping identifier that is determined based on a policy identifier and a control identifier associated with the policy and control, respectively, that constitute the control mapping. For instance, a control mapping identifier may, in embodiments, be determined by performing an operation, such as, but not limited to, a logical operation, a mathematical operation, a string operation, and/or the like, on the policy identifier and the control identifier.

In embodiments, training data 202 may be extracted and/or derived from security frameworks and/or benchmarks developed by a variety of entities, such as, but not limited to, technology companies, standards setting organizations (e.g., NIST, ISO, etc.), industry organizations, and/or regulatory agencies. For instance, textual descriptions of policies and/or controls may, in embodiments, be extracted from the security frameworks and/or benchmarks to form the textual description of the control mappings in the training samples. Similarly, policy identifier and/or control identifiers may, in embodiments, be extracted from the security frameworks and/or benchmarks to form the basis for the control mapping identifier in the training samples.

In embodiments, training data 202 is provided to service information processor 108 to produce processed training data 206 that is in a format that enhances the quality and/or effectiveness of policy predictor model 110. In embodiments, training data 202 provided as input to service information processor 108 may include, but is not limited to, a description of the service, a service requirement associated with the service, resources associated with the service, entities associated with the service, a threat assessment associated with the service, a threat vector, and/or the like. In embodiments, the processing performed by service information processor 108 may include, but is not limited to, cleaning of raw text data by removing irrelevant characters, symbols, and/or formatting inconsistencies, tokenization to break down sentences into individual words and/or subword units, removal of stop words and/or commonly occurring terms that may not contribute significantly to the semantic meaning, stemming and/or lemmatization to normalize word forms, feature extraction to encode the input into numerical vectors that capture semantic meaning of the input, dimensionality reduction to reduce the number of features needed to represent the input, and/or the like. In embodiments, feature extraction may be accomplished through various techniques, such as, but not limited to, bag-of-words to represent the input based on word frequencies, TF-IDF (Term Frequency-Inverse Document Frequency), to weigh the importance of terms in the input to a larger corpus, word and/or sentence embeddings, such as, but not limited to, Word2Vec or GloVe, to capture semantic relationships between words. In embodiments, service information processor 108 may provide processed training data 206 to model trainer 204 for training and/or validating policy predictor model 110.

Model trainer 204 is configured to train, validate, and/or deploy policy predictor model 110 based on processed training data 206. In embodiments, model trainer 204 may train policy predictor model 110 by iteratively training and validating policy predictor model 110 using separate subsets of processed training data 206. For instance, during an iteration, a first subset of processed training data 206 may be used to train policy predictor model 110, while a second subset of processed training data 206 may be reserved for validation of policy predictor model 110. Various methods may be employed to train policy predictor model 110, such as, but not limited to, the use of decision trees, a random forest algorithm, support vector machines, neural networks, k-Nearest Neighbors, K-means clustering, Naïve Bayes, gradient boosting, transfer learning, and/or the like.

In embodiments, policy predictor model 110 may be trained iteratively starting with a model that is initialized with initial weights. During an iteration, a subset of processed training data 206 is provided to the model to determine predicted control mapping identifiers. The predicted control mapping identifiers are compared, using a loss function, to the expected control mapping identifiers provide as labels in the labeled training dataset. In embodiments, the weights may be adjusted in an iteration to reduce an error determined by the loss function.

In embodiments, model trainer 204 may train policy predictor model 110 using an ensemble method that combines the predictions of a plurality of machine-learning models. For example, model trainer 204 may train policy predictor model 110 using a gradient boosting technique by building a series of weak learners and combining their predictions to create a robust and accurate model. By training a new learner to correct the errors made by the ensemble up to that point, gradient boosting minimizes a predefined loss function by adjusting the weights of misclassified instances, where a new tree is fitted to the negative gradient of the loss function.

In embodiments, model trainer 204 may validate policy predictor model 110 based on a second subset of processed training data 206 that is reserved for validation purposes. During validation, model trainer 204 may evaluate the ability of policy predictor model 110 to predict a control mapping based on unseen data (e.g., the second subset of the labeled training dataset). In embodiments, the training and validation process may be performed through cross-validation, where iterations in a series of iterations include training the model using a training dataset and validating the model using a separate validation dataset.

In embodiments, model trainer 204 may train policy predictor model 110 until an error determined by the loss function satisfies an accuracy requirement and/or converges to a particular error value. Once policy predictor model 110 is trained, model trainer 204 may deploy, as trained model 208, policy predictor model 110 to enable policy predictor model 110 to classify customer data in a production environment. For example, model trainer 204 may, in embodiments, deploy one or more instances of policy predictor model 110 to one or more servers of infrastructure 104.

Figure 3:
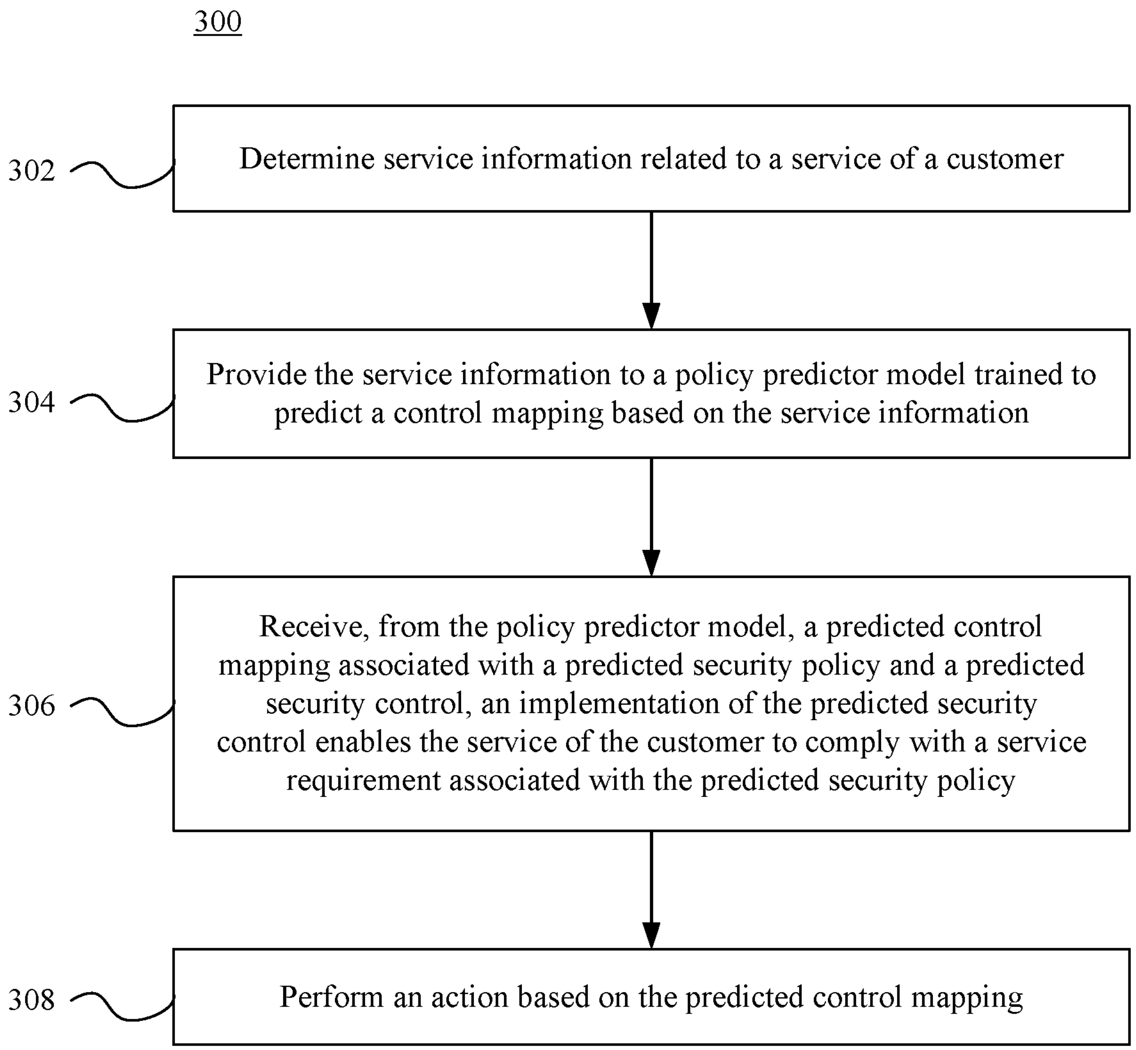
FIG. 3 depicts a flowchart of a process for automatically identifying a control mapping, in accordance with an embodiment.

Embodiments described herein may operate in various ways to automatically identify a control mapping. For instance, FIG. 3 depicts a flowchart 300 of a process for automatically identifying a control mapping, in accordance with an embodiment. Server infrastructure 104, service information processor 108, policy predictor model 110, and/or action handler 112 of FIGS. 1-2 may operate according to flowchart 300, for example. Note that not all steps of flowchart 300 may need to be performed in all embodiments, and in some embodiments, the steps of flowchart 300 may be performed in different orders than shown. Flowchart 300 is described as follows with respect to FIGS. 1-2 for illustrative purposes.

Flowchart 300 starts at step 302. In step 302, service information related to a service of a customer is determined. For example, service information processor 108 may determine service information related to customer service(s) 116. In embodiments, service information processor 108 may determine service information related to customer service(s) 116 based on information provided by customer device(s) 102 via request(s) 120. In embodiments, service information processor 108 may determine service information related to customer service(s) 116 by receiving service information from cloud environment(s) 114 via one or more interfaces (e.g., APIs) provided by cloud environment(s) 114. In embodiments, service information processor 108 may process the determined service information to generate processed service information 122, and provide processed service information 122 to policy predictor model 110 for classification.

In step 304, the service information is provided to a policy predictor model trained to predict a control mapping based on the service information. For example, service information processor 108 may provide processed service information 122 to policy predictor model 110 to predict a control mapping based on processed service information In step 306, a predicted control mapping associated with a predicted security policy and a predicted security control is received from the policy predictor model, an implementation of the predicted security control enables the service of the customer to comply with a service requirement associated with the predicted security policy. For example, action handler 112 may receive, from policy predictor model 110, predicted control mapping(s) 124. In embodiments, action handler 112 may receive, for predicted control mapping(s) 124, confidence and/or similarity score(s) indicative of a degree of relevance between processed service information 122 and predicted control mapping(s) 124.

In step 308, an action is performed based on the predicted control mapping. For example, action handler 112 may perform an action based on predicted control mapping(s) 124. As discussed above, action handler 112 may determine the responsive action to be performed based on one or more factors, such as, but not limited to, a predicted security policy associated with predicted control mapping(s) 124, a predicted security control associated with predicted control mapping(s) 124, customer preferences, the confidence and/or similarity score associated with predicted control mapping(s) 124, and/or the like. For instance, action handler 112 may, in embodiments, provide the predicted control mapping(s) 124 to the application 118 to enable the customer to implement a predicted security control associated with predicted control mapping(s) 124 on customer service(s) 116 to comply with a predicted security policy associated with predicted control mapping(s) 124. In embodiments, action handler 112 may automatically implement, on behalf of the customer, a predicted security control associated with predicted control mapping(s) 124 on customer service(s) 116 to comply with a predicted security policy associated with predicted control mapping(s) 124. For instance, action handler 112 may, in embodiments, automatically implement a predicted security control associated with predicted control mapping(s) 124 by issuing one or more instructions and/or commands to one or more on-premises resources (not depicted) and/or cloud environment(s) 114. In embodiments, action handler 112 may issue instructions and/or commands to cloud environment(s) 114 using one or more interfaces (e.g., APIs) provided by cloud environment(s) 114. In embodiments, action handler 112 may issue instructions and/or commands to cloud environment(s) 114 to modify a configuration and/or operation of customer service(s) 116.

Figure 4:
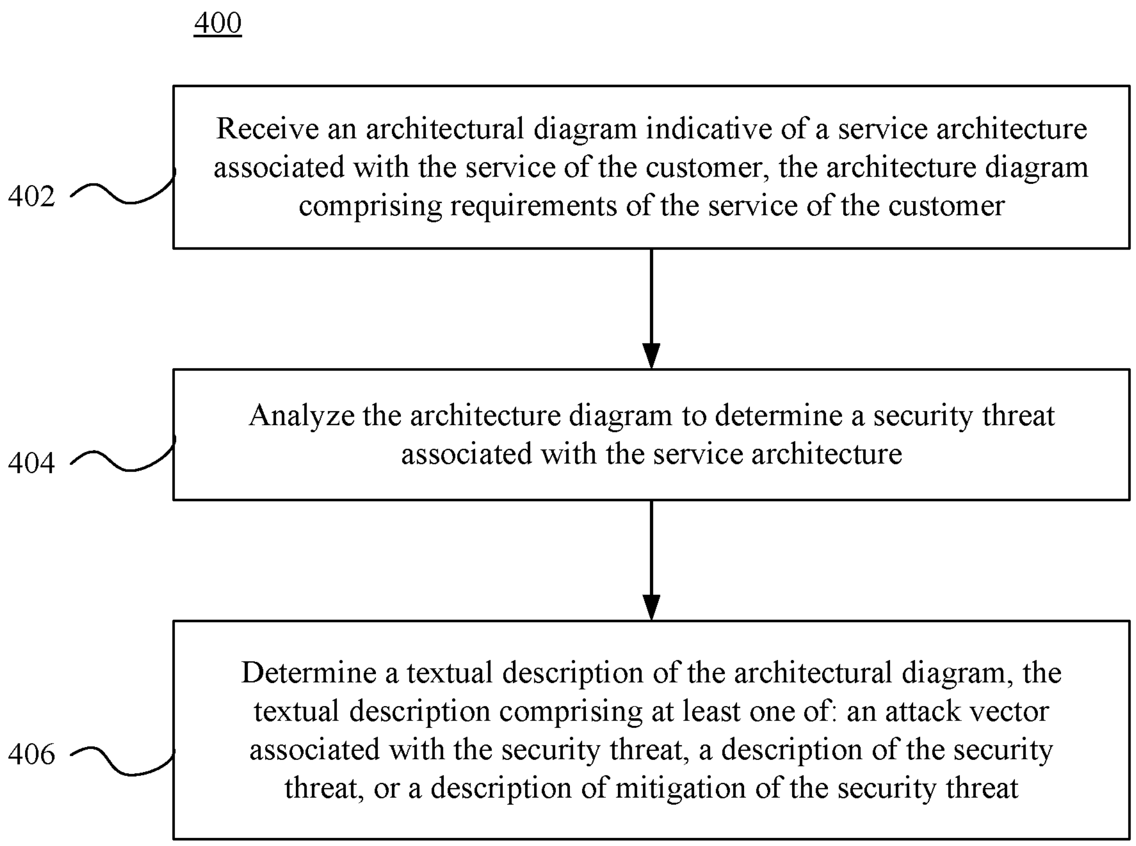
FIG. 4 depicts a flowchart of a process for generating a textual description of a service based on an architectural diagram of the service, in accordance with an embodiment.

Embodiments described herein may operate in various ways to generate a textual description of a service based on an architectural diagram of the service. For instance, FIG. 4 depicts a flowchart 400 of a process for generating a textual description of a service based on an architectural diagram of the service, in accordance with an embodiment. Server infrastructure 104, service information processor 108, policy predictor model 110, and/or action handler 112 of FIGS. 1-2 may operate according to flowchart 400, for example. Note that not all steps of flowchart 400 may need to be performed in all embodiments, and in some embodiments, the steps of flowchart 400 may be performed in different orders than shown. Flowchart 400 is described as follows with respect to FIGS. 1-2 for illustrative purposes.

Flowchart 400 starts at step 402. In step 402, an architectural diagram indicative of a service architecture associated with the service of the customer is received, the architecture diagram comprising requirements of the service of the customer. For example, service information processor 108 may receive an architectural diagram indicative of a service architecture of customer service(s) 116 via request(s) 120.

In step 404, the architecture diagram is analyzed to determine a security threat associated with the service architecture. For example, service information processor 108 may analyze the architecture diagram to determine a security threat associated with the service architecture. In embodiments, service information processor 108 may analyze the architectural diagram using a threat assessment tool (not depicted).

In step 406, a textual description of the architectural diagram is determined, the textual description comprising at least one of: an attack vector associated with the security threat, a description of the security threat, or a description of mitigation of the security threat. For example, service information processor 108 may determine a textual description of the architectural diagram, the textual description comprising at least one of: an attack vector associated with the security threat, a description of the security threat, or a description of mitigation of the security threat. In embodiments, service information processor 108 may determine the textual description of the architectural diagram using a threat assessment tool (not depicted).

Figure 5:
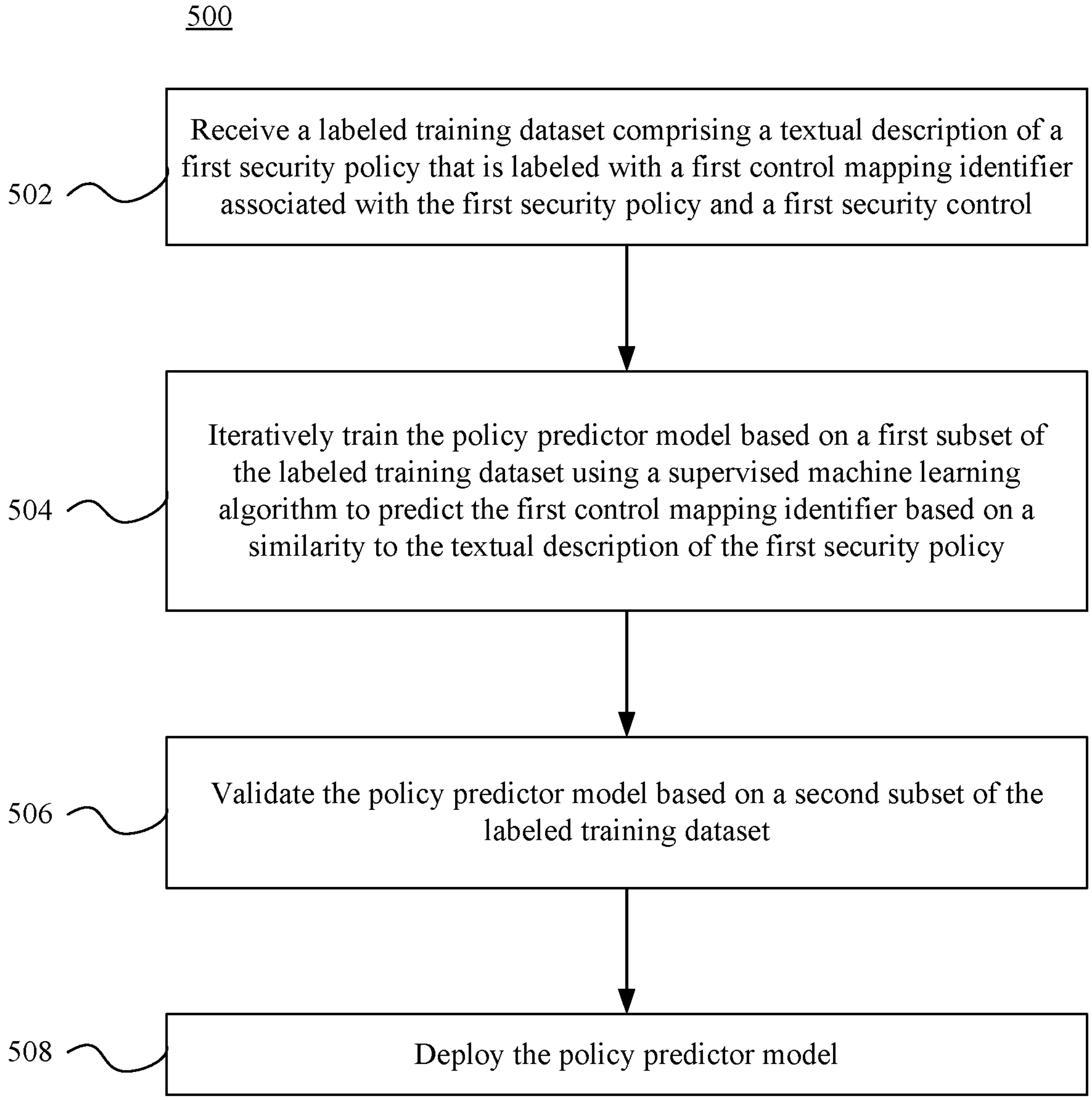
FIG. 5 depicts a flowchart of a process for training a policy predictor model for predicting a control mapping for a service based on a textual description of the service, in accordance with an embodiment.

Embodiments described herein may operate in various ways to train a policy predictor model for predicting a control mapping for a service based on a textual description of the service. For instance, FIG. 5 depicts a flowchart 500 of a process for training a policy predictor model for predicting a control mapping for a service based on a textual description of the service, in accordance with an embodiment. Server infrastructure 104, service information processor 108, policy predictor model 110, action handler 112, training data 202, and/or model trainer 204 of FIGS. 1-2 may operate according to flowchart 500, for example. Note that not all steps of flowchart 500 may need to be performed in all embodiments, and in some embodiments, the steps of flowchart 500 may be performed in different orders than shown. Flowchart 500 is described as follows with respect to FIGS. 1-2 for illustrative purposes.

Flowchart 500 starts at step 502. In step 502, a labeled training dataset is received, the labeled training dataset comprising a textual description of a first security policy that is labeled with a first control mapping identifier associated with the first security policy and a first security control. For example, model trainer 204 may receive processed training data 206. As discussed above, processed training data 206 may include a plurality of training samples that comprise a textual description (e.g., policy description, control description, rationale, etc.) of a control mapping that maps a control identifier to a policy and/or rationale, and a label that identifies the control mapping. In embodiments, the label may include a control mapping identifier that is determined based on a policy identifier and a control identifier associated with the policy and control, respectively, that constitute the control mapping.

In step 504, the policy predictor model is iteratively trained based on a first subset of the labeled training dataset using a supervised machine learning algorithm to predict the first control mapping identifier based on a similarity to the textual description of the first security policy. For example, model trainer 204 may train policy predictor model 110 based on a first subset of processed training data 206. As discussed above, various methods may be employed to train policy predictor model 110, such as, but not limited to, the use of decision trees, a random forest algorithm, support vector machines, neural networks, k-Nearest Neighbors, K-means clustering, Naïve Bayes, gradient boosting, transfer learning, and/or the like.

In step 506, a second subset of the labeled training dataset is used to validate the policy predictor model. For example, model trainer 204 may validate policy predictor model 110 using a second subset of processed training data 206 reserved for validation purposes.

In step 508, the policy predictor model is deployed. For example, model trainer 204 may deploy policy predictor model 110. In embodiments, model trainer 204 may train policy predictor model 110 until an error determined by the loss function satisfies an accuracy requirement and/or converges to a particular error value. Once policy predictor model 110 is trained, model trainer 204 may deploy policy predictor model 110 to enable policy predictor model 110 to classify customer data in a production environment. For example, model trainer 204 may, in embodiments, deploy policy predictor model 110 to one or more servers of infrastructure 104.

Figure 6:
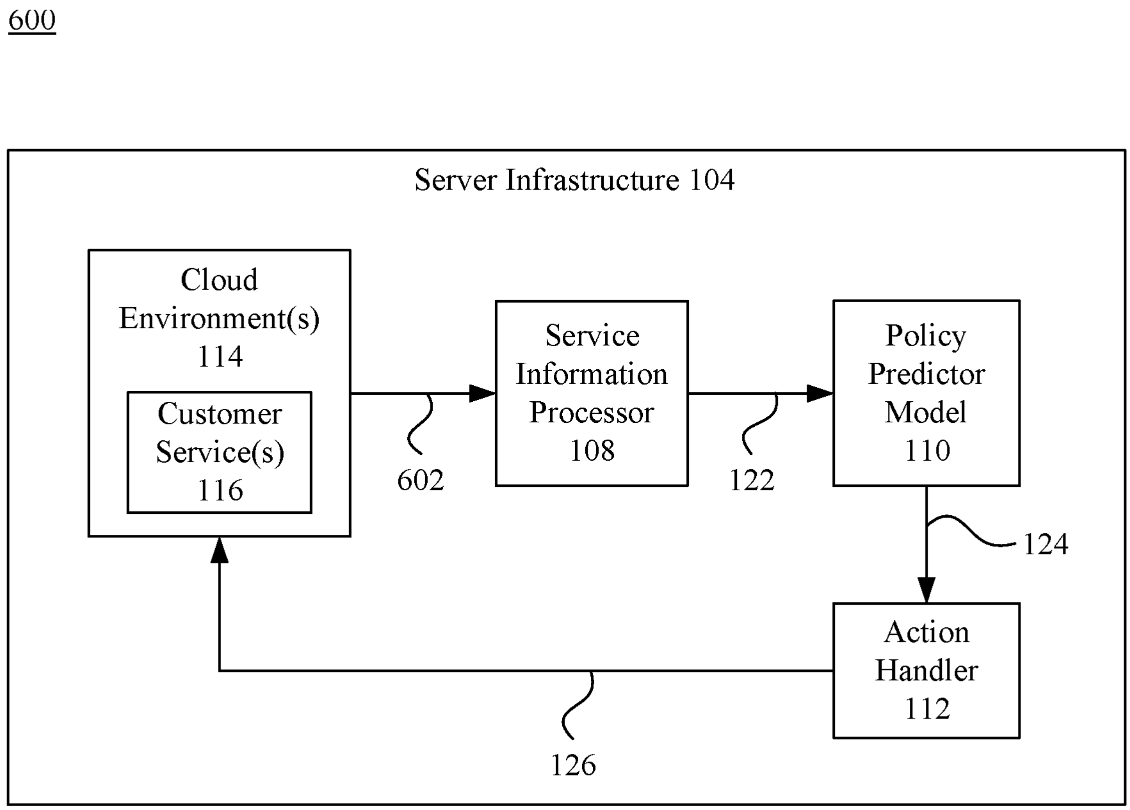
FIG. 6 depicts a block diagram of an example system for automatically identifying a control mapping for a service deployed in a multi-cloud environment and implanting the identified control mapping in the multi-cloud environment, in accordance with an embodiment.

Embodiments described herein may operate in various ways to automatically identify a control mapping for a multi-cloud service and implement the identified control mapping in the multi-cloud environment. For instance, FIG. 6 depicts a block diagram of an example system 600 for automatically identifying a control mapping for a multi-cloud service and implanting the identified control mapping in the multi-cloud environment, in accordance with an embodiment. As shown in FIG. 6, system 600 includes server infrastructure 104, service information processor 108, policy predictor model 110, action handler 112, cloud environment(s) 114, and customer service(s) 116. System 600 is described in further detail as follows.

As shown in FIG. 6, service information processor 108 may receive service information 602 from cloud environment(s) 114. For instance, service information processor 108 may, in embodiments, determine service information related to customer service(s) 116 that is deployed in a hybrid-cloud and/or multi-cloud environment by receiving service information from cloud environment(s) 114 via one or more interfaces (e.g., APIs) provided by cloud environment(s) 114. As discussed above, customer service(s) 116 may be deployed on one or more of cloud environment(s) 114 and may utilize computing resources, storage resources, applications, and/or cloud services provided by cloud environment(s) 114. In embodiments, customer service(s) 116 may be duplicated across cloud environment(s) 114 in order to provide redundancy and improve service availability. In embodiments, customer service(s) 116 may combine computing resources, storage resources, applications, and/or cloud services provided by different cloud environment(s) 114 to provide customer service(s) 116. In embodiments, customer service(s) 116 may also utilize computing resources, storage resources, applications, and/or other services provided by an on-premises resource (not depicted).

Moreover, as shown in FIG. 6, action handler 112 may, in embodiments, action handler 112 may automatically implement, on behalf of the customer, a predicted security control associated with predicted control mapping(s) 124 on customer service(s) 116 to comply with a predicted security policy associated with predicted control mapping(s) 124. For instance, action handler 112 may, in embodiments, issue one or more instructions and/or commands 126 to one or more cloud environment(s) 114. In embodiments, action handler 112 may issue instructions and/or commands 126 to cloud environment(s) 114 using one or more interfaces (e.g., APIs) provided by cloud environment(s) 114 to modify a configuration and/or operation of customer service(s) 116.

Figure 7:
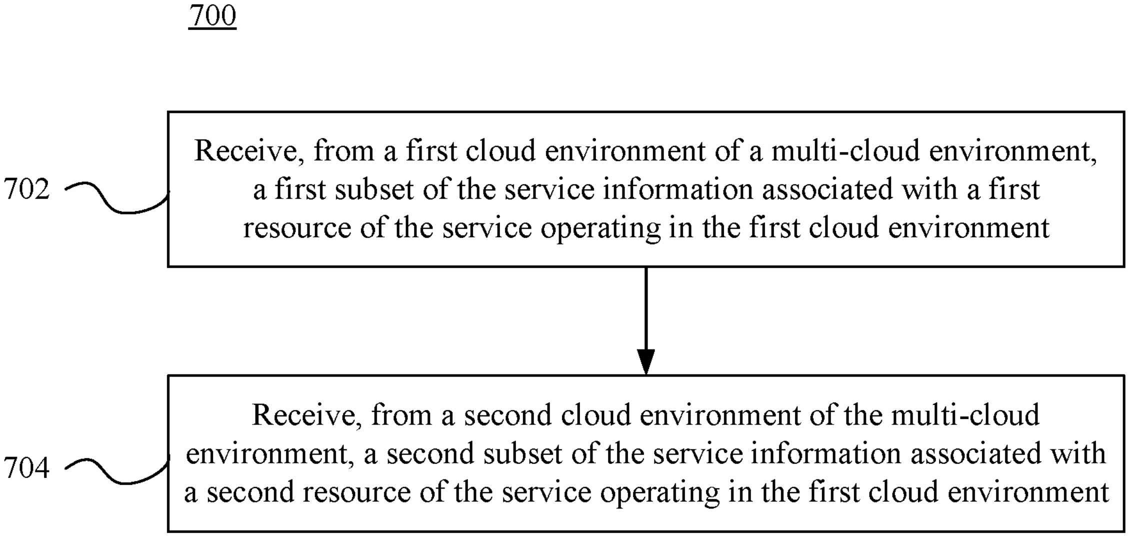
FIG. 7 depicts a flowchart of a process for automatically determining service information associated with a multi-cloud service operating in a multi-cloud environment, in accordance with an embodiment.

Embodiments described herein may operate in various ways to automatically determine service information associated with a multi-cloud service operating in a multi-cloud environment. For instance, FIG. 7 depicts a flowchart 700 of a process for automatically determining service information associated with a multi-cloud service operating in a multi-cloud environment, in accordance with an embodiment. Server infrastructure 104, service information processor 108, policy predictor model 110, and/or action handler 112, of FIGS. 1-2 and 6 may operate according to flowchart 700, for example. Note that not all steps of flowchart 700 may need to be performed in all embodiments, and in some embodiments, the steps of flowchart 700 may be performed in different orders than shown. Flowchart 700 is described as follows with respect to FIGS. 1-2 and 6 for illustrative purposes.

Flowchart 700 starts at step 702. In step 702, a first subset of the service information associated with a first resource of the service operating in the first cloud environment is received from the first cloud environment. For example, service information processor 108 may receive, from a first cloud environment of cloud environment(s) 114, a first subset of service information 602 associated with a first resource (not shown) operating in the first cloud environment of cloud environment(s) 114.

In step 704, a second subset of the service information associated with a second resource of the service operating in the second cloud environment is received from the second cloud environment. For example, service information processor 108 may receive, from a second cloud environment of cloud environment(s) 114, a second subset of service information 602 associated with a second resource (not shown) operating in the second cloud environment of cloud environment(s) 114.

III. Example Mobile Device and Computer System Implementation

The systems and methods described above in reference to FIGS. 1-7, including customer device(s) 102, server infrastructure 104, network(s) 106, service information processor 108, policy predictor model 110, action handler 112, cloud environment(s) 114, customer service(s) 116, application 118, training data 202, model trainer 204, and/or each of the components described therein, and/or the steps of flowcharts 300, 400 and/or 500 may be implemented in hardware, or hardware combined with one or both of software and/or firmware. For example, customer device(s) 102, server infrastructure 104, network(s) 106, service information processor 108, policy predictor model 110, action handler 112, cloud environment(s) 114, customer service(s) 116, application 118, training data 202, model trainer 204, and/or each of the components described therein, and/or the steps of flowcharts 300, 400 and/or 500 may be each implemented as computer program code/instructions configured to be executed in one or more processors and stored in a computer readable storage medium. Alternatively, customer device(s) 102, server infrastructure 104, network(s) 106, service information processor 108, policy predictor model 110, action handler 112, cloud environment(s) 114, customer service(s) 116, application 118, training data 202, model trainer 204, and/or each of the components described therein, and/or the steps of flowcharts 300, 400 and/or 500 may be each implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 8:
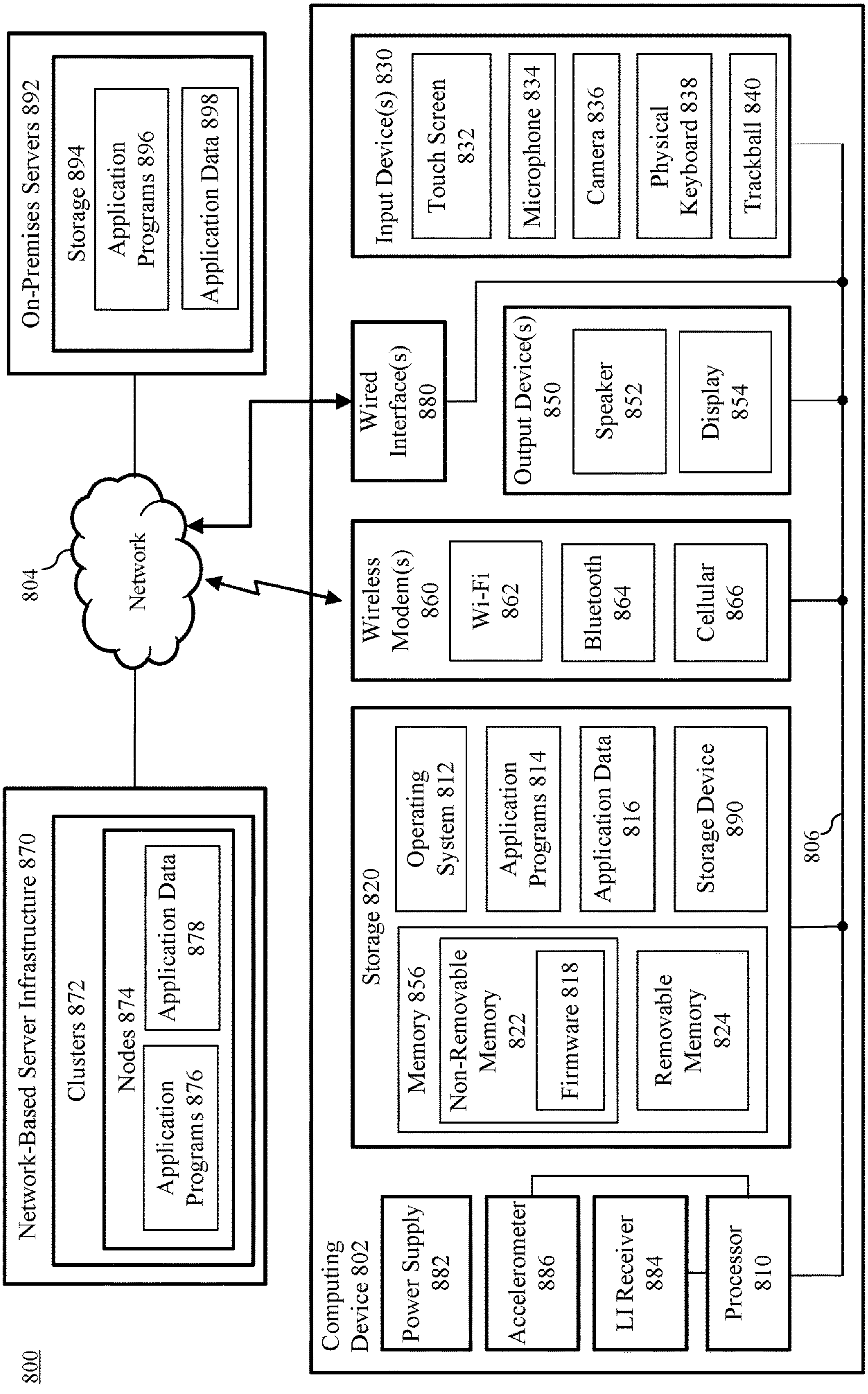
FIG. 8 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 8. FIG. 8 shows a block diagram of an exemplary computing environment 800 that includes a computing device 802. Computing device 802 is an example of customer device(s) 102 shown in FIGS. 1 and 2, which may each include one or more of the components of computing device 802. In some embodiments, computing device 802 is communicatively coupled with devices (not shown in FIG. 8) external to computing environment 800 via network 804. Network 804 comprises one or more networks such as local area networks (LANs), wide area networks (WANs), enterprise networks, the Internet, etc., and may include one or more wired and/or wireless portions. Network 804 may additionally or alternatively include a cellular network for cellular communications. Computing device 802 is described in detail as follows.

Computing device 802 can be any of a variety of types of computing devices. For example, computing device 802 may be a mobile computing device such as a handheld computer (e.g., a personal digital assistant (PDA)), a laptop computer, a tablet computer, a hybrid device, a notebook computer, a netbook, a mobile phone (e.g., a cell phone, a smart phone, etc.), a wearable computing device (e.g., a head-mounted augmented reality and/or virtual reality device including smart glasses), or other type of mobile computing device. Computing device 802 may alternatively be a stationary computing device such as a desktop computer, a personal computer (PC), a stationary server device, a minicomputer, a mainframe, a supercomputer, etc.

As shown in FIG. 8, computing device 802 includes a variety of hardware and software components, including a processor 810, a storage 820, one or more input devices 850, one or more output devices 850, one or more wireless modems f0, one or more wired interfaces 860, a power supply 862, a location information (LI) receiver 864, and an accelerometer 866. Storage 820 includes memory 856, which includes non-removable memory 822 and removable memory 824, and a storage device 890. Storage 820 also stores an operating system 812, application programs 814, and application data 816. Wireless modem(s) 860 include a Wi-Fi modem 862, a Bluetooth modem 864, and a cellular modem 866. Output device(s) 850 includes a speaker 852 and a display 854. Input device(s) 850 includes a touch screen 852, a microphone 854, a camera 856, a physical keyboard 858, and a trackball 840. Not all components of computing device 802 shown in FIG. 8 are present in all embodiments, additional components not shown may be present, and any combination of the components may be present in a particular embodiment. These components of computing device 802 are described as follows.

A single processor 810 (e.g., central processing unit (CPU), microcontroller, a microprocessor, signal processor, ASIC (application specific integrated circuit), and/or other physical hardware processor circuit) or multiple processors 810 may be present in computing device 802 for performing such tasks as program execution, signal coding, data processing, input/output processing, power control, and/or other functions. Processor 810 may be a single-core or multi-core processor, and each processor core may be single-threaded or multithreaded (to provide multiple threads of execution concurrently). Processor 810 is configured to execute program code stored in a computer readable medium, such as program code of operating system 812 and application programs 814 stored in storage 820. The program code is structured to cause processor 810 to perform operations, including the processes/methods disclosed herein. Operating system 812 controls the allocation and usage of the components of computing device 802 and provides support for one or more application programs 814 (also referred to as "applications" or "apps"). Application programs 814 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein. Processor(s) 810 may include one or more general processors (e.g., CPUs) configured with or coupled to one or more hardware accelerators, such as one or more NPUs and/or one or more GPUs.

Any component in computing device 802 can communicate with any other component according to function, although not all connections are shown for ease of illustration. For instance, as shown in FIG. 8, bus 806 is a multiple signal line communication medium (e.g., conductive traces in silicon, metal traces along a motherboard, wires, etc.) that may be present to communicatively couple processor 810 to various other components of computing device 802, although in other embodiments, an alternative bus, further buses, and/or one or more individual signal lines may be present to communicatively couple components. Bus 806 represents one or more of any of several types of bus structures, including a memory bus or memory controller, a peripheral bus, an accelerated graphics port, and a processor or local bus using any of a variety of bus architectures.

Storage 820 is physical storage that includes one or both of memory 856 and storage device 890, which store operating system 812, application programs 814, and application data 816 according to any distribution. Non-removable memory 822 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 822 may include main memory and may be separate from or fabricated in a same integrated circuit as processor 810. As shown in FIG. 8, non-removable memory 822 stores firmware 818, which may be present to provide low-level control of hardware. Examples of firmware 818 include BIOS (Basic Input/Output System, such as on personal computers) and boot firmware (e.g., on smart phones). Removable memory 824 may be inserted into a receptacle of or otherwise coupled to computing device 802 and can be removed by a user from computing device 802. Removable memory 824 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 890 may be present that are internal and/or external to a housing of computing device 802 and may or may not be removable. Examples of storage device 890 include a hard disk drive, a SSD, a thumb drive (e.g., a USB (Universal Serial Bus) flash drive), or other physical storage device.

One or more programs may be stored in storage 820. Such programs include operating system 812, one or more application programs 814, and other program modules and program data. Examples of such application programs may include, for example, computer program logic (e.g., computer program code/instructions) for implementing customer device(s) 102, server infrastructure 104, network(s) 106, service information processor 108, policy predictor model 110, action handler 112, cloud environment(s) 114, customer service(s) 116, application 118, training data 202, model trainer 204, and/or each of the components described therein, as well as any of flowcharts 300, 400, 500, and/or any individual steps thereof.

Storage 820 also stores data used and/or generated by operating system 812 and application programs 814 as application data 816. Examples of application data 816 include web pages, text, images, tables, sound files, video data, and other data, which may also be sent to and/or received from one or more network servers or other devices via one or more wired or wireless networks. Storage 820 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 802 through one or more input devices 850 and may receive information from computing device 802 through one or more output devices 850. Input device(s) 850 may include one or more of touch screen 852, microphone 854, camera 856, physical keyboard 858 and/or trackball 840 and output device(s) 850 may include one or more of speaker 852 and display 854. Each of input device(s) 850 and output device(s) 850 may be integral to computing device 802 (e.g., built into a housing of computing device 802) or external to computing device 802 (e.g., communicatively coupled wired or wirelessly to computing device 802 via wired interface(s) 860 and/or wireless modem(s) 860). Further input devices 850 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 854 may display information, as well as operating as touch screen 852 by receiving user commands and/or other information (e.g., by touch, finger gestures, virtual keyboard, etc.) as a user interface. Any number of each type of input device(s) 850 and output device(s) 850 may be present, including multiple microphones 854, multiple cameras 856, multiple speakers 852, and/or multiple displays 854.

One or more wireless modems 860 can be coupled to antenna(s) (not shown) of computing device 802 and can support two-way communications between processor 810 and devices external to computing device 802 through network 804, as would be understood to persons skilled in the relevant art(s). Wireless modem 860 is shown generically and can include a cellular modem 866 for communicating with one or more cellular networks, such as a GSM network for data and voice communications within a single cellular network, between cellular networks, or between the mobile device and a public switched telephone network (PSTN). Wireless modem 860 may also or alternatively include other radio-based modem types, such as a Bluetooth modem 864 (also referred to as a “Bluetooth device”) and/or Wi-Fi modem 862 (also referred to as an “wireless adaptor”). Wi-Fi modem 862 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 864 is configured to communicate with another Bluetooth-capable device according to the Bluetooth short-range wireless technology standard(s) such as IEEE 802.15.1 and/or managed by the Bluetooth Special Interest Group (SIG).

Computing device 802 can further include power supply 862, LI receiver 864, accelerometer 866, and/or one or more wired interfaces 860. Example wired interfaces 860 include a USB port, IEEE 1394 (Fire Wire) port, a RS-232 port, an HDMI (High-Definition Multimedia Interface) port (e.g., for connection to an external display), a DisplayPort port (e.g., for connection to an external display), an audio port, and/or an Ethernet port, the purposes and functions of each of which are well known to persons skilled in the relevant art(s). Wired interface(s) 860 of computing device 802 provide for wired connections between computing device 802 and network 804, or between computing device 802 and one or more devices/peripherals when such devices/peripherals are external to computing device 802 (e.g., a pointing device, display 854, speaker 852, camera 856, physical keyboard 858, etc.). Power supply 862 is configured to supply power to each of the components of computing device 802 and may receive power from a battery internal to computing device 802, and/or from a power cord plugged into a power port of computing device 802 (e.g., a USB port, an A/C power port). LI receiver 864 may be used for location determination of computing device 802 and may include a satellite navigation receiver such as a Global Positioning System (GPS) receiver or may include other type of location determiner configured to determine location of computing device 802 based on received information (e.g., using cell tower triangulation, etc.). Accelerometer 866 may be present to determine an orientation of computing device 802.

Note that the illustrated components of computing device 802 are not required or all-inclusive, and fewer or greater numbers of components may be present as would be recognized by one skilled in the art. For example, computing device 802 may also include one or more of a gyroscope, barometer, proximity sensor, ambient light sensor, digital compass, etc. Processor 810 and memory 856 may be co-located in a same semiconductor device package, such as being included together in an integrated circuit chip, FPGA, or system-on-chip (SOC), optionally along with further components of computing device 802.

In embodiments, computing device 802 is configured to implement any of the above-described features of flowcharts herein. Computer program logic for performing any of the operations, steps, and/or functions described herein may be stored in storage 820 and executed by processor 810.

In some embodiments, server infrastructure 870 may be present in computing environment 800 and may be communicatively coupled with computing device 802 via network 804. Server infrastructure 870, when present, may be a network-accessible server set (e.g., a cloud-based environment or platform). As shown in FIG. 8, server infrastructure 870 includes clusters 872. Each of clusters 872 may comprise a group of one or more compute nodes and/or a group of one or more storage nodes. For example, as shown in FIG. 8, cluster 872 includes nodes 874. Each of nodes 874 are accessible via network 804 (e.g., in a “cloud-based” embodiment) to build, deploy, and manage applications and services. Any of nodes 874 may be a storage node that comprises a plurality of physical storage disks, SSDs, and/or other physical storage devices that are accessible via network 804 and are configured to store data associated with the applications and services managed by nodes 874. For example, as shown in FIG. 8, nodes 874 may store application data 878.

Each of nodes 874 may, as a compute node, comprise one or more server computers, server systems, and/or computing devices. For instance, a node 874 may include one or more of the components of computing device 802 disclosed herein. Each of nodes 874 may be configured to execute one or more software applications (or “applications”) and/or services and/or manage hardware resources (e.g., processors, memory, etc.), which may be utilized by users (e.g., customers) of the network-accessible server set. For example, as shown in FIG. 8, nodes 874 may operate application programs 876. In an implementation, a node of nodes 874 may operate or comprise one or more virtual machines, with each virtual machine emulating a system architecture (e.g., an operating system), in an isolated manner, upon which applications such as application programs 876 may be executed.

In an embodiment, one or more of clusters 872 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 872 may be a datacenter in a distributed collection of datacenters. In embodiments, exemplary computing environment 800 comprises part of a cloud-based platform.

In an embodiment, computing device 802 may access application programs 876 for execution in any manner, such as by a client application and/or a browser at computing device 802.

For purposes of network (e.g., cloud) backup and data security, computing device 802 may additionally and/or alternatively synchronize copies of application programs 814 and/or application data 816 to be stored at network-based server infrastructure 870 as application programs 876 and/or application data 878. For instance, operating system 812 and/or application programs 814 may include a file hosting service client configured to synchronize applications and/or data stored in storage 820 at network-based server infrastructure 870.

In some embodiments, on-premises servers 892 may be present in computing environment 800 and may be communicatively coupled with computing device 802 via network 804. On-premises servers 892, when present, are hosted within an organization's infrastructure and, in many cases, physically onsite of a facility of that organization. On-premises servers 892 are controlled, administered, and maintained by IT (Information Technology) personnel of the organization or an IT partner to the organization. Application data 898 may be shared by on-premises servers 892 between computing devices of the organization, including computing device 802 (when part of an organization) through a local network of the organization, and/or through further networks accessible to the organization (including the Internet). Furthermore, on-premises servers 892 may serve applications such as application programs 896 to the computing devices of the organization, including computing device 802. Accordingly, on-premises servers 892 may include storage 894 (which includes one or more physical storage devices such as storage disks and/or SSDs) for storage of application programs 896 and application data 898 and may include one or more processors for execution of application programs 896. Still further, computing device 802 may be configured to synchronize copies of application programs 814 and/or application data 816 for backup storage at on-premises servers 892 as application programs 896 and/or application data 898.

Embodiments described herein may be implemented in one or more of computing device 802, network-based server infrastructure 870, and on-premises servers 892. For example, in some embodiments, computing device 802 may be used to implement systems, clients, or devices, or components/subcomponents thereof, disclosed elsewhere herein. In other embodiments, a combination of computing device 802, network-based server infrastructure 870, and/or on-premises servers 892 may be used to implement the systems, clients, or devices, or components/subcomponents thereof, disclosed elsewhere herein.

As used herein, the terms "computer program medium," "computer-readable medium," "computer-readable storage medium," and "computer-readable storage device," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 820. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 814) may be stored in storage 820. Such computer programs may also be received via wired interface(s) 860 and/or wireless modem(s) 860 over network 804. Such computer programs, when executed or loaded by an application, enable computing device 802 to implement features of embodiments discussed herein. Accordingly, such computer programs represent controllers of the computing device 802.

Embodiments are also directed to computer program products comprising computer code or instructions stored on any computer-readable medium or computer-readable storage medium. Such computer program products include the physical storage of storage 820 as well as further physical storage types.

IV. Additional Example Embodiments

In embodiments, a method comprises: determining service information related to a service of a customer; providing the service information to a policy predictor model trained to predict a control mapping based on the service information; receiving, from the policy predictor model, a predicted control mapping associated with a predicted security policy and a predicted security control, an implementation of the predicted security control enables the service of the customer to comply with a service requirement associated with the predicted security policy; and performing an action based on the predicted control mapping.

In embodiments, determining service information comprises: receiving an architectural diagram indicative of a service architecture associated with the service of the customer, the architecture diagram comprising requirements of the service of the customer; analyzing the architecture diagram to determine a security threat associated with the service architecture; and determining, as the service information, a textual description of the architectural diagram, the textual description comprising at least one of: an attack vector associated with the security threat, a description of the security threat, or a description of mitigation of the security threat.

In embodiments, the service of the customer is deployed in a multi-cloud environment, and determining service information comprises: receiving, from a first cloud environment of the multi-cloud environment, a first subset of the service information comprising service information associated with a first resource of the service, the first resource operating in the first cloud environment; and receiving, from a second cloud environment of the multi-cloud environment, a second subset of the service information comprising service information associated with a second resource of the service, the second resource operating in the second cloud environment.

In embodiments, performing an action comprises at least one of: providing the predicted control mapping to the customer, the customer enabled to apply the predicted security control to the service; or automatically applying the predicted security control to the service of the customer.

In embodiments, the method further comprises: receiving a labeled training dataset comprising a textual description of a first security policy that is labeled with a first control mapping identifier associated with the first security policy and a first security control; iteratively training the policy predictor model based on a first subset of the labeled training dataset using a supervised machine learning algorithm to predict the first control mapping identifier based on a similarity to the textual description of the first security policy; validating the policy predictor model based on a second subset of the labeled training dataset; and deploying the policy predictor model.

In embodiments, the service information comprises at least one of: a service requirement associated with the service; a security threat associated with the service; an attack vector associated with the security threat; a description of the security threat; or a description of mitigation of the security threat.

In embodiments, the predicted security control comprises a control associated with at least one of: a framework developed by a subject matter expert; a standard developed by a standards setting organization; or a regulation developed by a regulatory agency.

In embodiments, a system comprises: a processor; and a memory device comprising program code structured to cause the processor to: determine service information related to a service of a customer; provide the service information to a policy predictor model trained to predict a control mapping based on the service information; receive, from the policy predictor model, a predicted control mapping associated with a predicted security policy and a predicted security control, an implementation of the predicted security control enables the service of the customer to comply with a service requirement associated with the predicted security policy; and perform an action based on the predicted control mapping.

In embodiments, to determine the service information, the program code is structured to further cause the processor to: receive an architectural diagram indicative of a service architecture associated with the service of the customer, the architecture diagram comprising requirements of the service of the customer; analyze the architecture diagram to determine a security threat associated with the service architecture; and determine, as the service information, a textual description of the architectural diagram, the textual description comprising at least one of: an attack vector associated with the security threat, a description of the security threat, or a description of mitigation of the security threat.

In embodiments, the service of the customer is deployed in a multi-cloud environment, and, to determine the service information, the program code is structured to further cause the processor to: receive, from a first cloud environment of the multi-cloud environment, a first subset of the service information comprising service information associated with a first resource of the service, the first resource operating in the first cloud environment; and receive, from a second cloud environment of the multi-cloud environment, a second subset of the service information comprising service information associated with a second resource of the service, the second resource operating in the second cloud environment.

In embodiments, to perform the action, the program code is structured to further cause the processor to perform at least one of: provide the predicted control mapping to the customer, the customer enabled to apply the predicted security control to the service; or automatically apply the predicted security control to the service of the customer.

In embodiments, the program code is structured to further cause the processor to: receive a labeled training dataset comprising a textual description of a first security policy that is labeled with a first control mapping identifier associated with the first security policy and a first security control; iteratively train the policy predictor model based on a first subset of the labeled training dataset using a supervised machine learning algorithm to predict the first control mapping identifier based on a similarity to the textual description of the first security policy; validate the policy predictor model based on a second subset of the labeled training dataset; and deploy the policy predictor model.

In embodiments, the service information comprises at least one of: a service requirement associated with the service; a security threat associated with the service; an attack vector associated with the security threat; a description of the security threat; or a description of mitigation of the security threat.

In embodiments, the predicted security control comprises a control associated with at least one of: a framework developed by a subject matter expert; a standard developed by a standards setting organization; or a regulation developed by a regulatory agency.

In embodiments, a computer-readable storage medium comprises computer-executable instructions that, when executed by a processor, cause the processor to: receive service information related to a service of a customer, the service deployed in a multi-cloud environment, at least a first portion of the service information received from a first cloud environment of the multi-cloud environment and a second portion of the service information received from a second cloud environment of the multi-cloud environment; provide the service information to a policy predictor model trained to predict a control mapping based on the service information; receive, from the policy predictor model, a predicted control mapping associated with a predicted security policy and a predicted security control, an implementation of the predicted security control enables the service of the customer to comply with a service requirement associated with the predicted security policy; and perform an action based on the predicted control mapping.

In embodiments, to determine the service information, the computer-executable instructions, when executed by the processor, further cause the processor to: receive an architectural diagram indicative of a service architecture associated with the service of the customer, the architecture diagram comprising requirements of the service of the customer; analyze the architecture diagram to determine a security threat associated with the service architecture; and determine, as the service information, a textual description of the architectural diagram, the textual description comprising at least one of: an attack vector associated with the security threat, a description of the security threat, or a description of mitigation of the security threat.

In embodiments, to perform the action, the computer-executable instructions, when executed by the processor, further cause the processor to perform at least one of: provide the predicted control mapping to the customer, the customer enabled to apply the predicted security control to the service; or automatically apply the predicted security control to the service of the customer.

In embodiments, the computer-executable instructions, when executed by the processor, further cause the processor to: receive a labeled training dataset comprising a textual description of a first security policy that is labeled with a first control mapping identifier associated with the first security policy and a first security control; iteratively train the policy predictor model based on a first subset of the labeled training dataset using a supervised machine learning algorithm to predict the first control mapping identifier based on a similarity to the textual description of the first security policy; validate the policy predictor model based on a second subset of the labeled training dataset; and deploy the policy predictor model.

In embodiments, the service information comprises at least one of: a service requirement associated with the service; a security threat associated with the service; an attack vector associated with the security threat; a description of the security threat; or a description of mitigation of the security threat.

In embodiments, the predicted security control comprises a control associated with at least one of: a framework developed by a subject matter expert; a standard developed by a standards setting organization; or a regulation developed by a regulatory agency.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method comprising:

receiving an architectural diagram indicative of a service architecture associated with a service of a customer;

analyzing the architectural diagram to determine a textual description of the architectural diagram, the textual description indicative of a security threat associated with the service architecture and comprising at least one of an attack vector of the security threat, a description of the security threat, or a description of mitigation of the security threat;

providing the textual description of the architectural diagram to a policy predictor model trained to predict a control mapping based on the at least one of the attack vector of the security threat, the description of the security threat, or the description of mitigation of the security threat;

receiving, from the policy predictor model, a predicted control mapping associated with a predicted security policy and a predicted security control, an implementation of the predicted security control enables the service of the customer to comply with a service requirement associated with the predicted security policy; and automatically applying the predicted security control to the service of the customer.

2. The method of claim 1, wherein the service of the customer is deployed in a multi-cloud environment, and wherein the method further comprises:

receiving, from a first cloud environment of the multi-cloud environment, first service information associated with a first resource of the service, the first resource operating in the first cloud environment; and receiving, from a second cloud environment of the multi-cloud environment, second service information associated with a second resource of the service, the second resource operating in the second cloud environment.

3. The method of claim 1, further comprising:

providing the predicted control mapping to the customer.

4. The method of claim 1, further comprising:

receiving a labeled training dataset comprising a textual description of a first security policy that is labeled with a first control mapping identifier associated with the first security policy and a first security control;

iteratively training the policy predictor model based on a first subset of the labeled training dataset using a supervised machine learning algorithm to predict the first control mapping identifier based on a similarity to the textual description of the first security policy;

validating the policy predictor model based on a second subset of the labeled training dataset; and deploying the policy predictor model.

5. The method of claim 1, wherein the predicted security control comprises a control associated with at least one of:

a framework developed by a subject matter expert;

a standard developed by a standards setting organization; or a regulation developed by a regulatory agency.

6. The method of claim 1, wherein analyzing the architectural diagram to determine the textual description is based on an output of a threat analysis tool.

7. A system comprising:

a processor; and a memory device comprising program code structured to cause the processor to:

receive an architectural diagram indicative of a service architecture associated with a service of a customer;

analyze the architectural diagram to determine a textual description of the architectural diagram, the textual description indicative of a security threat associated with the service architecture and comprising at least one of an attack vector of the security threat, a description of the security threat, or a description of mitigation of the security threat;

provide the textual description of the architectural diagram to a policy predictor model trained to predict a control mapping based on the at least one of the attack vector of the security threat, the description of the security threat, or the description of mitigation of the security threat;

receive, from the policy predictor model, a predicted control mapping associated with a predicted security policy and a predicted security control, an implementation of the predicted security control enables the service of the customer to comply with a service requirement associated with the predicted security policy; and automatically apply the predicted security control to the service of the customer.

8. The system of claim 7, wherein the service of the customer is deployed in a multi-cloud environment, and wherein the program code is structured to further cause the processor to:

receive, from a first cloud environment of the multi-cloud environment, first service information associated with a first resource of the service, the first resource operating in the first cloud environment; and receive, from a second cloud environment of the multi-cloud environment, second service information associated with a second resource of the service, the second resource operating in the second cloud environment.

9. The system of claim 7, wherein, the program code is structured to further cause the processor to:

provide the predicted control mapping to the customer.

10. The system of claim 7, wherein the program code is structured to further cause the processor to:

receive a labeled training dataset comprising a textual description of a first security policy that is labeled with a first control mapping identifier associated with the first security policy and a first security control;

iteratively train the policy predictor model based on a first subset of the labeled training dataset using a supervised machine learning algorithm to predict the first control mapping identifier based on a similarity to the textual description of the first security policy;

validate the policy predictor model based on a second subset of the labeled training dataset; and deploy the policy predictor model.

11. The system of claim 7, wherein the predicted security control comprises a control associated with at least one of:

a framework developed by a subject matter expert;

a standard developed by a standards setting organization; or a regulation developed by a regulatory agency.

12. The system of claim 7, wherein analyzing the architectural diagram to determine the textual description is based on an output of a threat analysis tool.

13. A computer-readable storage medium comprising computer- executable instructions that, when executed by a processor, cause the processor to:

receive an architectural diagram indicative of a service architecture associated with a service of a customer, the service deployed in a multi-cloud environment;

analyze the architectural diagram to determine a textual description of the architectural diagram, the textual description indicative of a security threat associated with the service architecture and comprising at least one of an attack vector of the security threat, a description of the security threat, or a description of mitigation of the security threat;

provide the textual description of the architectural diagram to a policy predictor model trained to predict a control mapping based on the at least one of the attack vector of the security threat, the description of the security threat, or the description of mitigation of the security threat;

receive, from the policy predictor model, a predicted control mapping associated with a predicted security policy and a predicted security control, an implementation of the predicted security control enables the service of the customer to comply with a service requirement associated with the predicted security policy; and automatically apply the predicted security control to the service of the customer.

14. The computer-readable storage medium of claim 13, wherein, the computer-executable instructions, when executed by the processor, further cause the processor to:

provide the predicted control mapping to the customer.

15. The computer-readable storage medium of claim 13, wherein the computer-executable instructions, when executed by the processor, further cause the processor to:

receive a labeled training dataset comprising a textual description of a first security policy that is labeled with a first control mapping identifier associated with the first security policy and a first security control;

iteratively train the policy predictor model based on a first subset of the labeled training dataset using a supervised machine learning algorithm to predict the first control mapping identifier based on a similarity to the textual description of the first security policy;

validate the policy predictor model based on a second subset of the labeled training dataset; and deploy the policy predictor model.

16. The computer-readable storage medium of claim 13, wherein the predicted security control comprises a control associated with at least one of:

a framework developed by a subject matter expert;

a standard developed by a standards setting organization; or a regulation developed by a regulatory agency.

* * * * *